United States Patent Office 3,442,881
Patented May 6, 1969

3,442,881
PROCESS FOR THE PREPARATION OF POLYMERS IN BEAD FORM
Alex K. Jahn, Williamsburg, Va., and Alfred R. Nelson, Bay City, Mich., assignors to The Dow Chemical Company, Midland, Mich., a corporation of Delaware
No Drawing. Filed May 2, 1966, Ser. No. 546,585
Int. Cl. C08f 1/11, 7/04
U.S. Cl. 260—93.5                                7 Claims

ABSTRACT OF THE DISCLOSURE

Styrene-type bead polymerization is shown wherein the suspending agent is zinc oxide. A relatively narrow particle size distribution of the beads is obtained by employing from about 0.1 to about 0.4 weight percent of disodium hydrogen phosphate based on the total weight of the zinc oxide.

---

This invention relates to an improved method for preparing polymers in bead form and more particularly relates to an improved process for the preparation of polymers in bead form.

In the preparation of synthetic resinous polymers in bead form, it is oftentimes desirable that the size of the beads be readily controllable. Usually, synthetic resinous polymer beads are prepared by suspension polymerization wherein monomer droplets are suspended in an aqueous medium and polymerized to provide beadlets desirably corresponding to the dimensions of the droplets. U.S. Patent No. 2,691,008 discloses a number of suspending or dispersing agents suitable for use in the preparation of polymer by bead or aqueous suspension polymerization. Particularly beneficial for the polymerization of vinylidene aromatic compounds in aqueous suspension is finely divided zinc oxide as a suspending agent. Our earlier application Ser. No. 421,616, filed Dec. 28, 1964, now abandoned discloses improved operation of such beads polymerized when the pH of the suspension medium is maintained within the range from about 9.3 to about 12. Oftentimes, it is desired to vary the particle size of the product of such a polymerization in a batch to batch manner in order that the product may be suitable for a desired application. For example, in the preparation of foamable polymer beads, variation in particle size influences the foaming and molding characteristics, for some applications larger beads are required while for other applications smaller beads are more desirable.

It has now been discovered that in the polymerization of styrene type vinylidene aromatic compounds employing finely divided zinc oxide in an aqueous suspension, the particle size of the product is readily controlled by the addition of from about 0.1 to 0.4 weight percent, based on the weight of the zinc oxide, disodium hydrogen phosphate (calculated on the basis of anhydrous disodium hydrogen phosphate).

It is important in carrying out the bead polymerization that the aqueous liquid containing the zinc oxide as a dispersing agent be at a pH of 9.3 to 9.5 at the start of the polymerization, i.e., as measured from 3 to 6 minutes after mixing, and that the pH of the aqueous phase be maintained basic, e.g., at above pH 7.0, throughout the polymerization in order to obtain the beneficial results of the invention.

The zinc oxide can be used in amounts corresponding to from about 0.5 to 5 parts by weight per 100 parts by weight of the monomer initially used, and when the monomer to water ratio used in the bead polymerization is within the range of from 1:0.8 to 1:4.

It is critical that the disodium hydrogen phosphate be based in an amount of 0.1 to 0.4 weight percent based on the amount of zinc oxide employed. Below about 0.1 weight percent, no appreciable affect is noted on the particle size of the suspension polymerization product. Whereas, if the quantity of disodium hydrogen phosphate exceeds about 0.4 weight percent of the amount of zinc oxide, the dispersing effectiveness of the oxide is destroyed and bead-like particles are not obtained.

The disodium hydrogen phosphate may be added to the suspension polymerization as an anhydrous salt or one or more of its hydrated forms, but the weight percent must be calculated in terms of the anhydrous salt. The particle size of the polymerization product increases in a manner generally proportional to the amount of disodium phosphate added, thus, smaller size particles are obtained using lesser quantities and larger patricles are obtained using greater quantities.

This behavior is in sharp contrast to other known basic materials added to the polymerization system. For example, ammonia or sodium hydroxide causes the particles to decrease in size as the quantity of the additive is increased, whereas the disodium hydrogen phosphate causes the particle size to increase.

The polymerization can be carried out in usual ways at atmospheric or superatmospheric pressure and at temperatures between about 60° and 180° C., preferably from about 90° to 150° C.

The process of the invention is applicable to the suspension polymerization of any polymerizable ethylenic monomer that is polymerizable under the conditions of suspension polymerization, with or without catalysts or polymerization initiators, and with the application of heat. The invention is particularly applicable to the polymerization of vinyl aryl monomers such as styrene, vinyltoluene, vinylxylene, ar-ethyl-vinylbenzene, isopropylstyrene, tert-butylstyrene, ortho- or para-mono-chlorostyrenes, dichlorostyrenes or mixtures of a major proportion by weight of one or more of such vinyl aryl monomers and not more than a minor proportion, i.e., 50 percent by weight or less, of another monoethylenically unsaturated monomer such as ethyl acrylate, methyl methacrylate, acrylonitrile, vinyl propionate, acrylic acid or methacrylic acid.

The process can also be carried out to form flame-proof styrene polymers by incorporating a suitable flame proofing agent, e.g., 1,2-dibromotetrachloroethane, monochloropentabromocyclohexane or tris(2,3-dibromopropyl)phosphate, with the monomer and polymerizing the latter to form polymer beads.

Foamable styrene polymer beads are suitably prepared by incorporating a volatile fluid organic compound such as petroleum ether, pentane, hexane, heptane, dichlorodifluoromethane, dichlorotetrafluoroethane or trifluorochloromethane with the monomer and polymerizing the latter in the aqueous suspension to form discrete beads or granules, or by first making the polymer beads then impregnating them with the volatile blowing agent.

The invention is further illustrated but not limited by the following examples.

EXAMPLE 1

A reaction vessel having a volume of 350 cubic centimeters is charged, while being shaken, with 150 grams of water, 3 grams of finely divided zinc oxide, 0.015 gram crystalline disodium hydrogen phosphate

equivalent to 0.008 gram anhydrous disodium hydrogen phosphate (0.265 weight percent based on the quantity of the zinc oxide). An additional 5 grams of water was employed to wash the disodium hydrogen phosphate into the reactor. The pH of the mixture measured after 5 minutes mixing was 9.35. A mixture of 100 grams of styrene and 0.3 gram of benzoyl peroxide was added to the reaction vessel. The vessel was closed and tumbled end over end at 24 r.p.m. in a liquid bath for 7 hours at a temperature of 90° C. followed by 5 hours at 115° C. The reaction vessel and contents were cooled. A polymer in the form of granules or beads was separated by filtering. The polymer was re-slurried in water, acidified to a pH of about 2 with aqueous 10 weight percent HCl solution to remove residual zinc oxide. The polymer was then washed with water and air dried. The dried polymer was subjected to a screen analysis to determine the percent by weight of the polymer particles on various U.S. Standard Sieves.

For purposes of comparison, a similar reaction was carried out with the exception that the disodium hydrogen phosphate was omitted. The pH of the aqueous phase 5 minutes after mixing was 7.3. The results are set forth in Table I wherein the column headed $a$ designates the screen analysis of the sample employing disodium hydrogen phosphate and the column headed $b$ is the result without disodium phosphate.

TABLE I

| Sample | a | b |
|---|---|---|
| Percent on U.S. Screen No.: | | |
| 12 | 2 | 1 |
| 18 | 14.5 | 1 |
| 20 | 15.5 | 2 |
| 25 | 20.5 | 4.5 |
| 30 | 18.5 | 12 |
| 35 | 10.5 | 12 |
| 40 | 9.5 | 17 |
| 50 | 7 | 27 |
| 60 | 1 | 9.5 |
| 70 | 1 | 6.5 |
| 80 | 0 | 5.5 |
| Through | 0 | 2 |

EXAMPLE 2

A plurality of runs were made employing 0.09 weight percent azo-bis-isobutyronitrile, 0.07 weight percent benzoyl peroxide, 0.05 weight percent tertiary butylperoxy isopropyl carbonate, the weight percentages being based upon the weight of styrene monomer employed in the reaction. 1.35 weight percent zinc oxide was employed as a solid dispersant, the percentage of the zinc oxide being based on the total weight of all components charged to the reactor. Polymerization is carried out with agitation for 5 hours at 80° C. and an additional 4 hours at 90° C. and 3 hours at 110° C. The polymer beads or granules were recovered, acid treated, washed and dried and size substantially in the manner described in Example 1. The results of four runs are shown in the following table.

TABLE II

| Run Number | 1 | 2 | 3 | 4 |
|---|---|---|---|---|
| Reactor Size, gallons | 50 | 50 | 20 | 20 |
| Phase Ratio Water/Styrene | .82 | .82 | 1.0 | 1.0 |
| Stirrer, r.p.m | 200 | 200 | 160 | 160 |
| Percent Na₂HPO₄ (on ZnO) | .10 | .15 | .15 | .20 |
| pH* | 9.3 | | | 9.35 |
| Bead Size, percent on U.S. Screen No.: | | | | |
| 10 | 0.3 | 24.3 | | 9.0 |
| 12 | 0.8 | 17.0 | | 5.5 |
| 18 | 8.5 | 50.0 | | 69.5 |
| 20 | 5.0 | 3.6 | | 9.0 |
| 25 | 8.0 | 3.2 | | 4.0 |
| 30 | 22.7 | 1.5 | 2.5 | 1.5 |
| 35 | 14.8 | 0.4 | 5.2 | 0.6 |
| 40 | 22.7 | 0 | 51.0 | 0.6 |
| 50 | 12.8 | | 34.3 | 0.3 |
| 60 | 3.6 | | 4.8 | 0 |
| 70 | | | 1.5 | |
| Through | 0.8 | | 0.7 | |

*5 minutes after mixing.

EXAMPLE 3

A 20 gallon stirred reactor was charged with 0.43 weight percent benzoyl peroxide, 0.4 weight percent dicumyl peroxide, 0.6 weight percent 1,2-dibromotetrachloroethane, 0.06 weight percent divinyl benzene. The foregoing is based on the weight of styrene. 1.66 weight percent of zinc oxide was employed as dispersant, the percentage being based on the total load. 1000 parts of styrene and 1200 parts of water were employed. This mixture was polymerized for 8 hours at 90° C. plus 2 hours at 103° C. 7.4 weight percent of a 3:1 mixture (by weight based on styrene) of normal pentane and 2,3-dimethyl butane was added to the reactor over a period of 4 hours beginning 4 hours after the contents of the reactor had reached 90° C. Expandable polystyrene beads were obtained which were washed and dried in a manner substantially similar to that set forth in Example 1. The results of two different levels of disodium hydrogen phosphate utilized with the foregoing procedure are set forth in Table III.

TABLE III

| Run Number | 5 | 6 |
|---|---|---|
| Percent Na₂HPO₄ (on ZnO) | .325 | .390 |
| pH* | | 9.45 |
| Bead Size, percent on U.S. Screen No.: | | |
| 10 | 1.6 | 2.8 |
| 12 | 5.5 | 15.7 |
| 18 | 76.5 | 72.7 |
| 20 | 10.8 | 6.0 |
| 25 | 3.8 | 2.0 |
| 30 | 1.4 | 0.8 |
| 35 | 0.4 | 0 |
| 40 | 0 | |

*5 minutes after mixing.

EXAMPLE 4

Several runs of flame-retardant expandable beads were prepared in a 750 gallon stirred reactor. All runs contained the following ingredients: 0.43 weight percent benzoyl peroxide; 0.40 weight percent dicumyl peroxide; 0.60 weight percent 1,2-dibromotetrachloroethane; 0.06 weight percent divinyl benzene; 3 weight percent zinc oxide. The foregoing percentages being based on the weight of styrene. The reactor contained 2200 pounds of styrene and 1760 pounds of water. Disodium hydrogen phosphate was added in quantities set forth in Table IV. Polymerization was carried out in accordance with the following schedule: 12 hours at 90° C. and 7 hours at 103° C. On reaching 103° C., 100 gallons of hot water were added to the reactor. Petroleum ether boiling over a range of from about 30–60° C. was added over a 4-hour period starting 4 hours after reaching 90° C. The concentration of the petroleum ether was 7.4 weight percent based on the styrene. The results are set forth in Table IV.

TABLE IV

| Run Number | 7 | 8 | 9 | 10 | 11 |
|---|---|---|---|---|---|
| Percent Na₂HPO₄ (on ZnO) | 0.04 | 0.08 | 0.12 | 0.21 | 0.38 |
| pH* | | 9.25 | 9.3 | 9.35 | 9.45 |
| Bead Size, percent on U.S. Screen No.: | | | | | |
| 18 | .2 | | .2 | 3.3 | 58.8 |
| 20 | .2 | .2 | .2 | 13.5 | 21.4 |
| 25 | .2 | .2 | 1.0 | 37.0 | 6.3 |
| 30 | 6.8 | 5.6 | 20.8 | 27.0 | 2.2 |
| 35 | 31.0 | 23.2 | 35.8 | 9.0 | .3 |
| 40 | 29.6 | 29.8 | 24.8 | 5.7 | 0 |
| 50 | 25.0 | 29.2 | 14.6 | 2.6 | 0 |
| Through | 6.2 | 11.6 | 2.4 | 1.7 | 0 |

*5 minutes after mixing.

EXAMPLE 5

Polystyrene beads were prepared in a 750 gallon reaction vessel having an agitator and internal baffle. The vessel was charged with 1760 pounds of water; 2200 pounds of styrene; 0.10 percent azo-bis-isobutyronitrile; 0.071 weight percent benzoyl peroxide; 0.068 weight percent tertiary butylperoxy isopropyl carbonate; 2.4 weight percent zinc oxide, all percentages being based on the weight of styrene. 0.151 weight percent of disodium hydrogen peroxide based on the weight of the zinc oxide was added. The reaction mixture was agitated and heated to 80° C. for a period of 4.5 hours; for 4.5 hours at 90° C., and an additional 4 hours at 125° C. An additional 100 gallons of water were added as the reactor was being heated from 90° to 123° C. After 195 minutes at 90° C., 0.01 weight percent of an amphoteric surfactant sold under the trade designation of Deriphat 154 manufactured by General Mills was added to aid in stabilizing the dispersion. The polymer beads were retrieved in the manner set forth in Example 1 to provide a product having the following screen analysis:

| On U.S. Screen No.: | Percent |
|---|---|
| 10 | .4 |
| 12 | .5 |
| 14 | .5 |
| 16 | 1.0 |
| 18 | 2.8 |
| 20 | 14.0 |
| 25 | 29.2 |
| 30 | 33.8 |
| 35 | 12.4 |
| 40 | 4.0 |
| Through | 1.4 |

By way of comparison, when the foregoing procedure was repeated without employing the disodium hydrogen phosphate, almost all of the beads passed through 40 mesh screen.

Similar beneficial and advantageous results are achieved when preparing copolymers of styrene and methyl methacrylate such as 80% styrene, 10% methyl methacrylate; styrene acrylonitrile such as 65% styrene, 35% acrylonitrile; vinyl toluene, chlorostyrene and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process for preparing polymer particles by polymerizing a polymerizable composition comprising at least one vinyl aryl monomer wherein the polymerizable composition is suspended in water containing zinc oxide as the suspending agent, the zinc oxide being present from about one half to about 5 weight percent based on the weight of the polymerizable vinyl aryl monomer employed, and the pH of the aqueous phase is 9.3–9.6 as measured 3 to 6 minutes after mixing, and the pH is maintained at above 7 throughout the polymerization, the improvement which comprises selectively controlling the particle size of the resultant bead by adding to the suspending medium prior to polymeriaztion from about 0.1 to about 0.4 weight percent of disodium hydrogen phosphate based on the total weight of the zinc oxide employed.

2. The process of claim 1 wherein the monomer to water ratio is within the range of about 1:0.8 to 1:4.

3. The process of claim 1 wherein the vinyl aryl monomer is styrene.

4. The process of claim 3 wherein there is present a free radical generating catalyst comprising a mixture of benzoyl peroxide, tertiary butylperoxy isopropyl carbonate,, azo-bis-isobutyronitrile.

5. The process of claim 1 wherein the polymerizable composition is polymerized at a temperature from about 60–180° C.

6. The process of claim 5 wherein the polymerization is carried out at temperatures from about 90–150° C.

7. The process of claim 1 wherein the catalyst is benzoyl peroxide.

References Cited
UNITED STATES PATENTS

| 2,122,886 | 7/1938 | Marks. | |
| 2,594,913 | 4/1952 | Grim | 260—93.5 |
| 2,687,408 | 8/1954 | Grim | 260—93.5 |
| 2,801,992 | 8/1957 | Hutchinson et al. | 260—93.5 |
| 3,009,888 | 11/1961 | Mueller et al. | 260—93.5 |
| 3,192,169 | 6/1965 | Doak | 260—93.5 |
| 3,222,343 | 12/1965 | Ingram et al. | 260—93.5 |

JAMES A. SEIDLECK, *Primary Examiner.*

U.S. Cl. X.R.

260—2.5, 85.5, 86.7, 87.3, 88.1